United States Patent
Hermans (10) Patent No.: US 10,944,288 B2
(45) Date of Patent: Mar. 9, 2021

(54) EMERGENCY POWER TRANSFER SWITCH SYSTEM

(71) Applicant: Leon Hermans, Alameda, CA (US)

(72) Inventor: Leon Hermans, Alameda, CA (US)

(*) Notice: Subject to any disclaimer, the term of this patent is extended or adjusted under 35 U.S.C. 154(b) by 139 days.

(21) Appl. No.: 16/111,678

(22) Filed: Aug. 24, 2018

(65) Prior Publication Data
US 2019/0067990 A1    Feb. 28, 2019

Related U.S. Application Data (60) Provisional application No. 62/549,789, filed on Aug. 24, 2017.

(51) Int. Cl.
| | |
|---|---|
| H02J 9/06 | (2006.01) |
| H01H 47/00 | (2006.01) |
| H05B 47/105 | (2020.01) |
| H05B 47/10 | (2020.01) |

(52) U.S. Cl.
CPC .......... *H02J 9/065* (2013.01); *H01H 47/002* (2013.01); *H05B 47/105* (2020.01); *H01H 2300/018* (2013.01); *H02J 9/068* (2020.01); *H05B 47/10* (2020.01)

(58) Field of Classification Search
CPC ................. H02J 9/02; H02J 9/04–08
See application file for complete search history.

(56) References Cited

U.S. PATENT DOCUMENTS

| | | | | | |
|---|---|---|---|---|---|
| 4,977,351 | A * | 12/1990 | Bavaro | ............... | H02J 9/065 |
| | | | | | 315/87 |
| 7,239,045 | B2 * | 7/2007 | Lathrop | ............... | H02J 9/061 |
| | | | | | 307/80 |
| 8,185,762 | B1 * | 5/2012 | Spangler | ............... | G06F 1/3265 |
| | | | | | 713/323 |
| 9,214,834 | B1 * | 12/2015 | Lunn | ............... | H02J 9/06 |
| 9,350,200 | B1 * | 5/2016 | Hong | ............... | H02J 9/061 |
| 2002/0130556 | A1 * | 9/2002 | Hohri | ............... | H02J 9/061 |
| | | | | | 307/65 |
| 2010/0141038 | A1 * | 6/2010 | Chapel | ............... | H01R 25/003 |
| | | | | | 307/64 |
| 2012/0326614 | A1 * | 12/2012 | Tsuji | ............... | H05B 45/10 |
| | | | | | 315/200 R |
| 2014/0001016 | A1 * | 1/2014 | Flegel | ............... | H01H 21/58 |
| | | | | | 200/271 |
| 2014/0097758 | A1 * | 4/2014 | Recker | ............... | H05B 47/19 |
| | | | | | 315/152 |

(Continued)

OTHER PUBLICATIONS

"EPC-D-F", LVS Inc., Apr. 14, 2016. (Year: 2016).*

(Continued)

*Primary Examiner* — Daniel J Cavallari
*Assistant Examiner* — David A Shiao
(74) *Attorney, Agent, or Firm* — Howard Cohen (57) ABSTRACT

An automatic transfer switch for transferring the electrical power supplied to a load between a primary power source and a secondary power source employs one SPST bistable relay, and two SPDT bistable relays to switch power between regular and emergency sources. A fourth relay, a SPDT relay, is optionally employed to direct power from the emergency source to emergency lighting fixtures so that emergency lighting is provided despite the presence of dimming circuits or switched off circuits or the like.

4 Claims, 5 Drawing Sheets

(56) References Cited

U.S. PATENT DOCUMENTS

2014/0183956 A1\* 7/2014 Wang ................ H02J 9/062
                                                                  307/64
2017/0090549 A1\* 3/2017 Wang ............... G06F 13/4022
2017/0244278 A1\* 8/2017 Luk ..................... H02J 7/02

OTHER PUBLICATIONS

S. Terry, M. Hefter, K. Vannice, "Understanding control of emergency lighting circuits", Mar. 2011, IAEI Magazine. (Year: 2011).\*
"AD-EPC-D-F-ATS", Legrand, Jul. 19, 2016. (Year: 2016).\*
"ELCR XXX-6A234", LSI Industries inc., Jan. 2018 (Year: 2018).\*

\* cited by examiner

EMERGENCY POWER TRANSFER SWITCH SYSTEM

CROSS-REFERENCE TO RELATED APPLICATIONS

This application asserts the priority date benefit of Provisional Application No. 62/549,789, filed Aug. 24, 2017.

FEDERALLY SPONSORED RESEARCH

Not applicable.

SEQUENCE LISTING, ETC ON CD

Not applicable.

BACKGROUND OF THE INVENTION

Field of the Invention

This invention relates to emergency lighting systems that provide illumination for buildings and the like during power failure, using an emergency power source and selected fixtures or luminaires within a larger lighting system.

Description of Related Art

In the past, safety codes required that emergency luminaires that are powered by an emergency generator or inverter during a power outage must be illuminated 24 hours per day, 7 days per week, to give a continual indication of their readiness and operability. In recent times, the codes have been changed to permit the use of a transfer switch (listed under UL1008 specs) or load control relay (listed under UL924 specs). to control both the regular and emergency luminaires at the same time (for example switching and dimming controls). During a utility power failure or room power interruption, only the designated emergency luminaires are illuminated automatically, using the emergency power source, regardless of the previous state of the room lighting (on, off or dim).

This arrangement is more convenient, but it does not provide the continuing assurance of emergency lighting readiness that was given by the older systems. As a result, it is necessary to provide a test feature and readiness indication for systems that use the new arrangements. Generally, this requirement is met by turning off the lighting branch circuit breaker that serves a particular area, which in turn automatically transfers the emergency light fixtures in that area to an emergency power source. Alternatively, a test button on the transfer switch or load control relay can simulate the loss of power. This test routine involves visiting each lighting panel or device, and is time consuming.

Intelligent building operating systems may incorporate sensors and subroutines to survey the emergency lighting systems in a building, and report problems or failures. These systems, however, may not fulfill code requirements for personal inspection of the systems and the individual responsibility it conveys. Nor do they provide the conclusive determination of eyewitness observation of proper testing of an emergency lighting system.

A reliable transfer switch must disconnect from the interrupted standard power supply and connect to the backup power system in virtually instantaneous fashion. However, the switching function must occur when the voltages on the load contacts and the secondary power system are matched, to avoid arcing and the potential for the contacts to become welded together, which could be catastrophic. This can occur when, for example, a reactive load such as fluorescent fixtures and their inductive ballasts are suddenly switched off, and the energy in the inductors surges into the newly connected power source. Thus disconnection of the interrupted power supply must occur first, followed by a short time delay, followed by connection to the secondary power supply. Therefore, some systems employ a time delay feature, and others employ a zero-crossing detector to assure that the new connections are made at a safe voltage transfer level. Still others employ mechanical relay interlocks that assure the switching relays cannot be activated simultaneously. However, no system currently available makes use of all of these safety features.

Automatic transfer switches known in the prior art typically make use of latching relays or contactors that consist of single-pole, single-throw relays. For example, U.S. Pat. No. 9,935,495 employs four latching relays in a switching arrangement driven by an electronic programmable controller to switch power to an electrical load from a first power source to a second, emergency power source. The latching relays are relatively expensive components, and the use of multiple latching relays drives up the cost of the automatic switching system.

BRIEF SUMMARY OF THE INVENTION

The present invention generally comprises a single-zone silent power transfer switch for emergency lighting applications. The transfer switch system allows emergency and normal lighting to be switched or dimmed from the same lighting control (such as a switch, dimmer, photo cell, occupancy sensor, or combination thereof) during normal operation. In the event of a utility power interruption, the invention will automatically transfer designated emergency fixtures from the lighting control to the emergency power source and bring them to full brightness, regardless of whether the lighting control system is in operation or turned off.

A momentary test switch on the front cover allows the user to simulate a power interruption when pressed. Three testing methods are provided for code compliance and maintenance purposes:
Integral Test Switch that provides a convenient testing feature at any time; Dry Contact Test input allows for a Fire Alarm Override or Remote Test; and an Auto Test option provides regular (e.g., monthly and annual) self-testing along with test record-keeping in on-board memory.

The transfer switch system provides four safety and reliability interlocks:
1) A voltage sensing interlock includes optically isolated voltage sensors to insure that erroneous voltage is not present at load terminals during transfer. This voltage sensing interlock also ensures transfer occurs at zero-crossing points of the voltage sources, reducing arcing and inrush currents that can prematurely wear out relay contacts.
2) A time-delay interlock provides a break-before-make circuit connection operation with a programmable time delay that insures that all contact arcing has been fully extinguished before attempting transfer to the alternate power source. This also eliminates the need for the two sources to be in-phase (synchronous).
3) A relay microswitch circuit supervises relay contact state. The circuit detects and alerts the microprocessor in the event of relay contact welding or malfunction, preventing phase to phase shorting across relay contacts.

Applications of the invention include providing power to designated switched or dimmable emergency luminaires in public places such as auditoriums, restaurants, conference rooms, lecture halls, theaters, and classrooms.

The circuit of the invention makes efficient use of components to reduce the number and cost of components. It employs one SPST bistable relay, and two SPDT bistable relays to switch power between regular (also sometimes called normal) and emergency sources. And it includes a fourth relay, a SPDT relay, which is optionally employed to direct power from the emergency source to emergency lighting fixtures so that emergency lighting is provided despite the presence of dimming circuits or switched off circuits or the like.

The details of the transfer switch system are shown in the accompanying drawings and description.

DESCRIPTION OF PREFERRED EMBODIMENT

The present invention generally comprises a single-zone automatic power transfer switch for emergency lighting applications. The transfer switch system allows emergency and normal lighting to be switched or dimmed from the same lighting control (such as switch or dimmer) during normal operation. In the event of a utility power interruption, the invention may be used to switch to the emergency power source, and to direct the emergency power automatically to designated emergency fixtures to bring them to full brightness, regardless of whether a lighting control system has been in operation, or turned off, during normal utility power operation.

Figure 1:
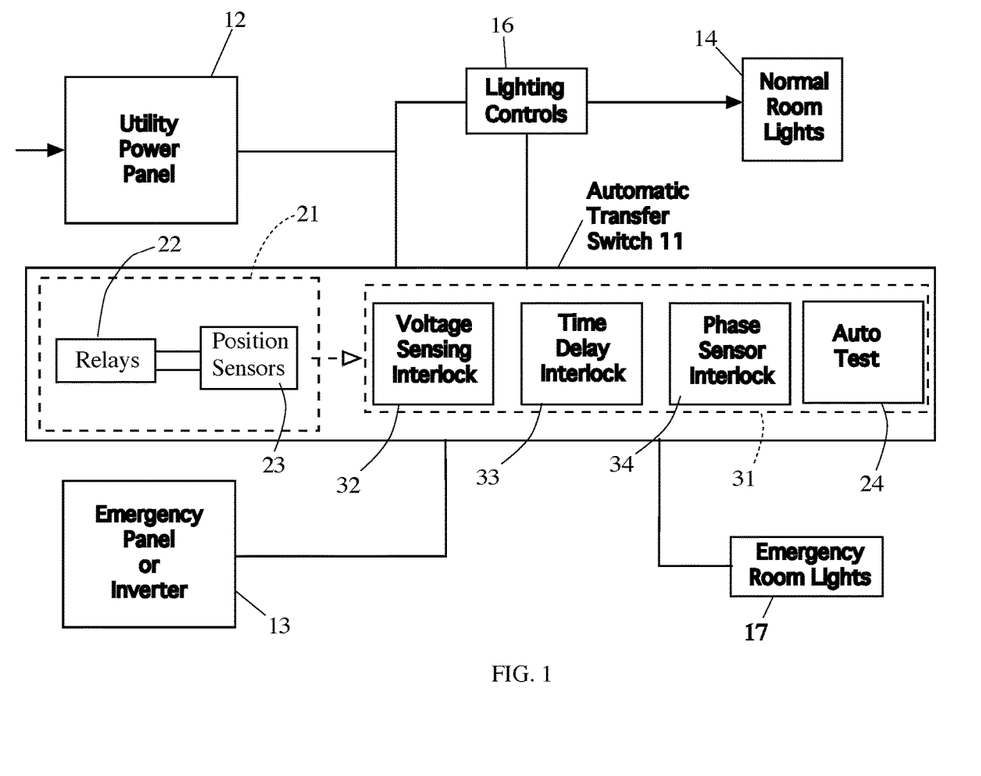
FIG. 1 is a functional block diagram depicting the operation of the automatic power transfer switch of the present invention.

With regard to the functional block diagram of FIG. 1, the automatic power transfer switch (ATS) 11 is connected to a primary power source, such as a utility power panel 12, as well as an emergency power panel or battery power inverter 13. (Throughout this description the terms "primary power source" and "utility power source" and the like may be used interchangeably. Likewise, the "secondary power source" and "emergency or inverter power" may be used interchangeably. Further, "emergency load" and "emergency lighting" and "emergency room lighting" and the like are also interchangeable.) ATS 11 is connected to (optional) normal room lights 14 through an (optional) lighting control 16, and also to designated emergency lights 17 to be illuminated in the event of failure of the primary power source 12. The ATS 11 includes a relay apparatus 21, which is comprised of a plurality of electrical relays 22 (detailed below) and an array of position sensors 23 to detect the connected state of each of the electrical relays. Relay position sensors are known in the prior art and are commercially available.

The ATS 11 further includes a microprocessor-based electronic control system 31 that is connected to the relays 22 to actuate the relays in a predetermined manner according to stored programming, as described below. The electronic control system 31 includes a voltage sensing interlock system 32, a time delay interlock system 33, and a voltage phase interlock system 34. The microprocessor of the electronic control system is programmed to receive signals from the interlock systems 32-34, as well as signals from position sensors 23, to control the switching of the relays 22 and substitute the emergency power source 13 for the primary power source 12 as required, as quickly and safely as possible. An auto test 24 is incorporated into the programming of the microprocessor and includes programming steps to execute automatic testing according to a pre-programmed schedule and record said test result (pass or fail) in memory for future recall.

Figure 2:
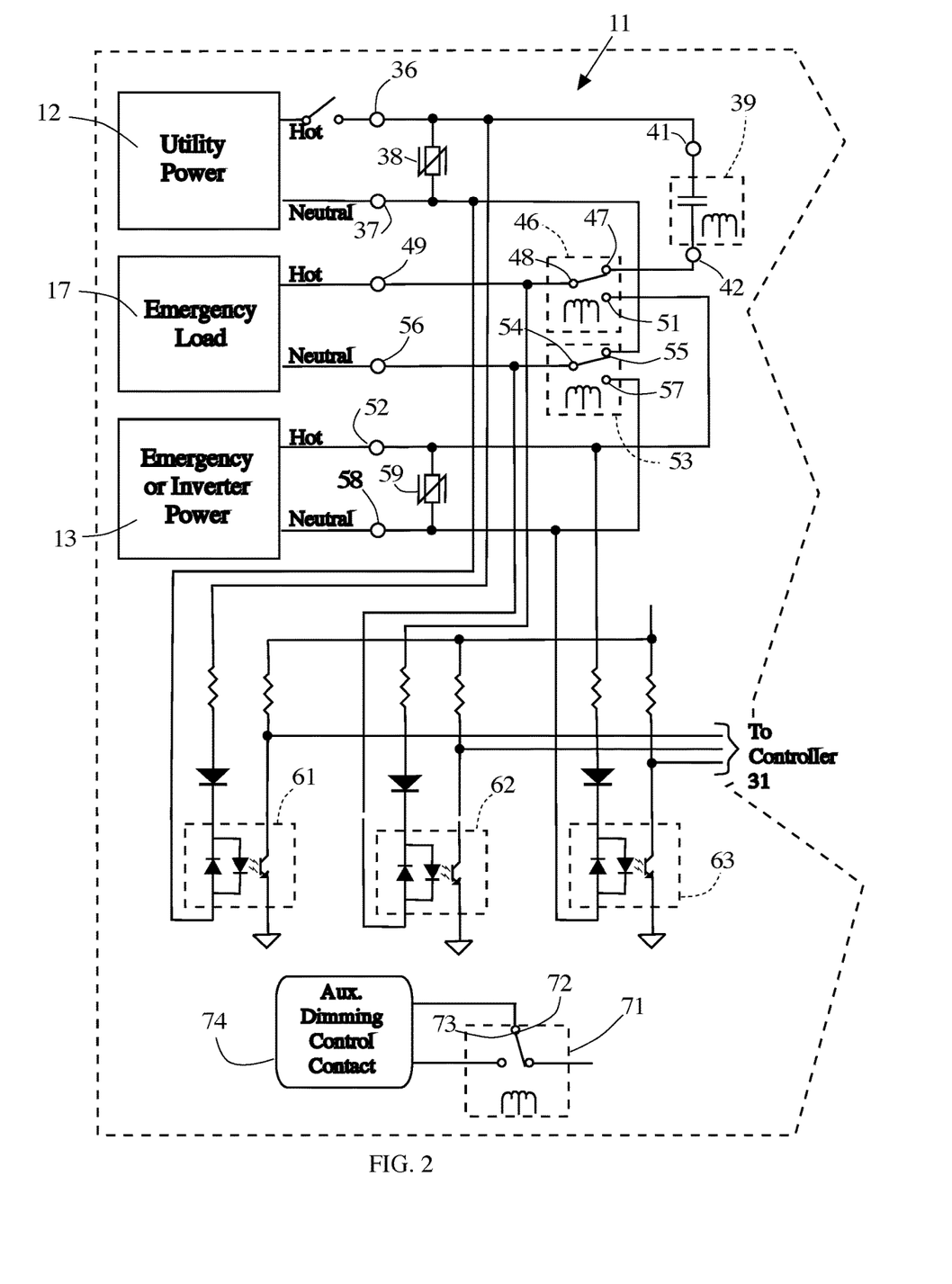
FIG. 2 is a circuit diagram of a portion of the automatic power transfer switch shown in FIG. 1.

With regard to the circuit layout of FIG. 2, the utility power source 12 includes a hot terminal 36 and a neutral terminal 37, with a MOV 38 connected therebetween to attenuate voltage transients across the power source. A relay 39 comprises a SPST bistable relay having a first contact 41 connected to the hot terminal 36 of the power source. Another relay 46 comprises a SPDT bistable relay having one contact 47 connected to terminal 42 of relay 39. Note that the hot side of the power source 12 is isolated from the other components in the circuit unless the relay 39 is latched in the conductive state. The common switch pole 48 of relay 46 is connected to the hot lead 49 of the emergency load 17, which is generally among the normal room lights 14. The other contact 51 of relay 46 is connected to the hot terminal 52 of the emergency power source 13. Note that the hot sides of the utility power supply 12 and emergency power supply 13 are connected to the opposed switch contacts of relay 46, and these two contacts can never be connected together through this relay.

Another relay 53 comprises a SPDT bistable relay having a common switch pole 54 connected to the neutral terminal 56 of the load 17, and one switch contact 55 connected to the neutral terminal 37 of the utility power source 12. The other switch contact 57 of relay 53 is connected to the neutral terminal 58 of the emergency power source 13. In addition, a MOV 59 is connected across terminals 52 and 58 of the power source 13 to attenuate voltage transients occurring across the power source. Note that all three terminals of relay 53 are connected to neutral terminals of the power systems and the load, and that the neutral connections of power sources 12 and 13 are connected to opposite switch contacts of relay 53, and that these two contacts cannot be connected together through this relay.

Figure 5:
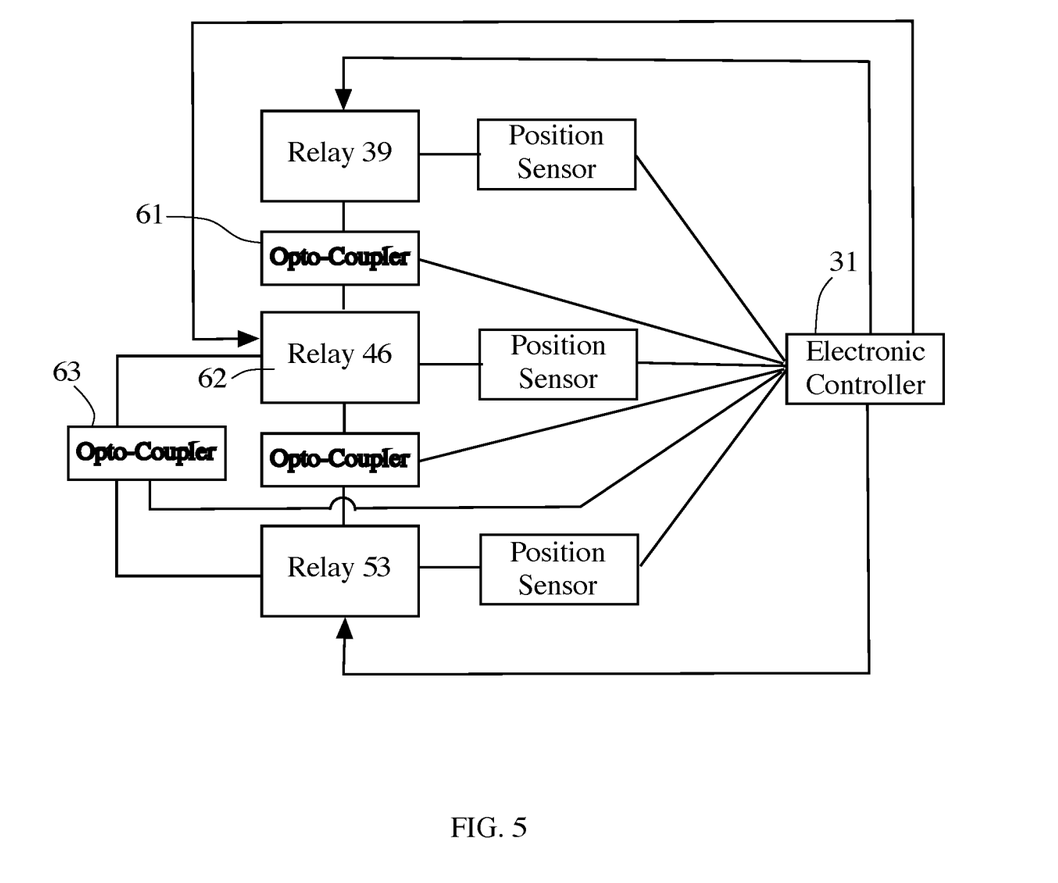
FIG. 5 is a functional block diagram showing the interconnected relays, sensors, and electronic controller.

The circuit layout further includes a trio of opto-isolator circuits 61, 62, and 63. Circuit 61 is connected across terminals 36 and 37 of the utility power source 12 to detect the voltage across those terminals in real time. Circuit 62 is connected across terminals 49 and 56 to detect the voltage across the emergency load 17, and circuit 63 is connected across terminals 52 and 58 to detect the voltage across the emergency power source 13. The signals from circuits 61-63 are conducted to electronic controller 31, along with the position sensor signals, as shown in FIG. 5, to be used by the voltage sensing interlock 32 and the phase sensor interlock 34. The controller 31 also powers the relays 39, 46, and 53 as shown in FIG. 5, in accordance with the stored programming steps described below.

Figure 3:
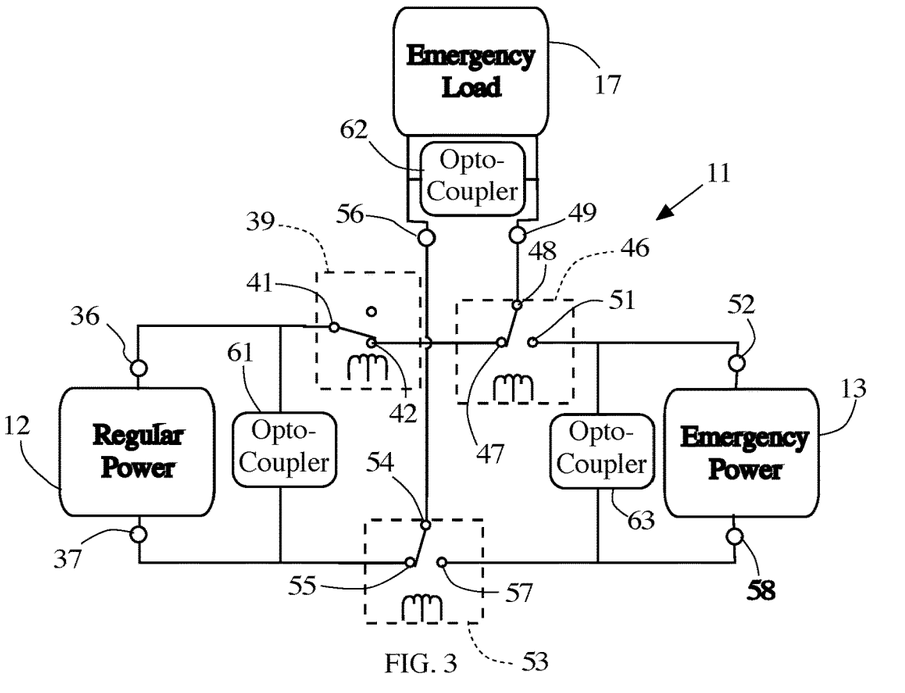
FIG. 3 is a functional circuit diagram depicting the automatic power transfer switch when disposed to connect the regular power source to the regular load.

With regard to FIG. 3, the ATS 11 is typically disposed in the non-transfer state in which the regular power source 12 is connected to the emergency load 17, and the emergency power source 13 is isolated and idle. In the non-transfer state the hot lead 36 of utility power source 12 is connected through connected contacts 41 and 42 of SPST relay 39 to contact 47 of SPDT relay 46, which is connected through switch pole 48 to the hot lead 49 of the emergency load 17. The neutral lead 56 of the emergency load 17 is connected through switch pole 54 of relay 53 to contact 55 and thence to the neutral connection 37 of the power source 12. Thus the power circuit from the source 12 to the load 17 is complete. Note that the emergency power source 13 is complete isolated at both the hot and neutral leads.

Figure 4:
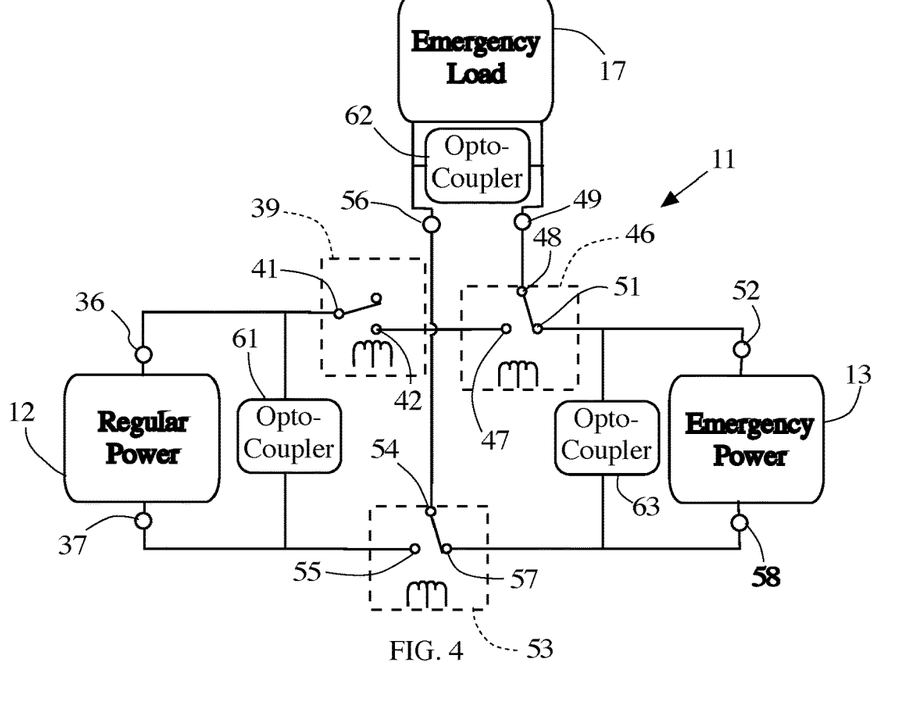
FIG. 4 is a functional circuit diagram depicting the automatic power transfer switch when disposed to connect the emergency power source to the regular load.

When the regular power source 12 fails, the ATS 11 switches to the transfer state shown in FIG. 4, in which the emergency power source 13 is connected to the load 17, and the utility (regular) power source 12 is disconnected. The contacts 41 and 42 of relay 39 are open, disconnecting the hot lead 36 of power source 12 from the circuit. Likewise, relay 53 is switched so that contact 55 and switch pole 54 are open and the neutral lead 37 of power source 12 is disconnected from the load 17. In addition, relay 46 is switched so that the hot lead 52 of power source 13 is connected through contact 51 and switch pole 48 of relay 46 to the hot lead 49 of load 17. The neutral lead 58 of power source 13 is connected through contact 57 and switch pole 54 of relay 53 to the neutral lead 56 of the load 17. Thus the emergency power circuit to the load is completed. Note that the regular power source 12 is completely isolated at both the hot and neutral leads.

It is notable that ATS 11 requires only three relays to carry out the automatic transfer function, whereas most systems known in the art use four relays for the same purposes. In addition, there are inherent safety features in the relay arrangement of ATS 11:

1) Relay 53 is connected only to neutral terminals of the power sources 12 and 13 and the load 17, eliminating the opportunity for hot power to be switched accidentally into a neutral connection.

2) The hot leads of both power sources 12 and 13 are connected to opposite switch contacts of relay 46, and therefore cannot be connected together in relay 46.

3) In the non-transfer state, the emergency power source 13 is complete isolated from the remainder of the circuit at both the hot and neutral leads.

4) In the transfer state, the regular power source 12 is completely isolated from the remainder of the circuit at both the hot and neutral leads.

Figure 6:
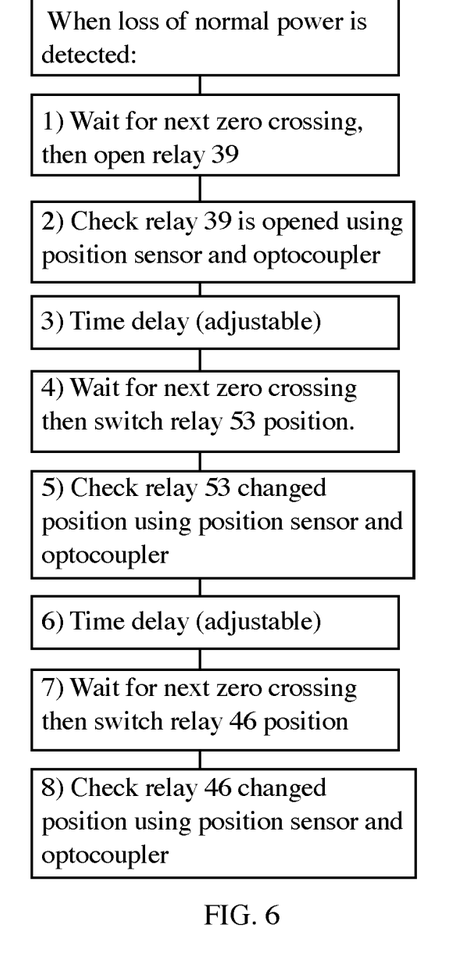
FIG. 6 is a flow chart depicting the steps required to transition the automatic power transfer switch from regular power mode to emergency power mode.

The process of switching from the non-transfer state to the transfer state is also provided with inherent safety features. As shown in FIG. 6, when normal loss of power is detected by voltage loss across the utility power leads 36 and 37, the control is programmed to wait for the next zero-crossing event, then open (unlatch) relay 39 to disconnect the hot lead 36 of power source 12 from the system. The controller then checks that relay 39 is opened using signals from the relay position sensor and the optocoupler 61. The controller 31 then implements a programmed time delay, then waits for the next zero-crossing event to switch relay 53 to disconnect the neutral lead of power source 12 from the load and isolating the power source 12. At the same time relay 53 connects neutral lead 58 of the power source 13 to the neutral lead of the load 17.

The controller 31 then implements another programmable time delay, and then waits for the next zero-crossing event to switch relay 46. This action connects the hot lead of power source 13 to the hot lead of load 17, and the power circuit from source 13 to load 17 is complete. As a final check, the controller checks the signals from the relay position sensor and the optocouplers to confirm proper operation. The shift to the transfer state is then complete, and may be maintained inde finitely.

Figure 7:
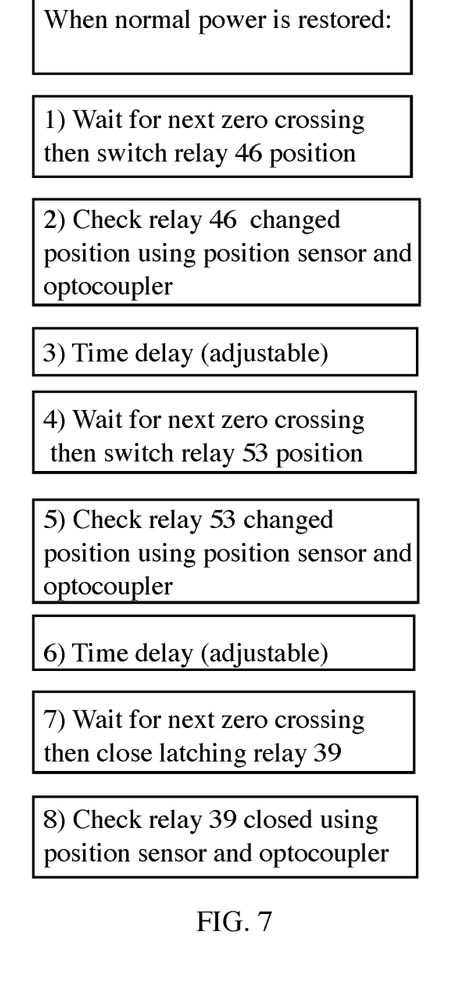
FIG. 7 is a flow chart depicting the steps required to transition the automatic power transfer switch from emergency power mode to regular power mode.

With reference to FIG. 7, the processing of switching from the transfer state of FIG. 4 to the non-transfer state of FIG. 3 requires first that the power source return to normal operation, as detected by the optocoupler 61. The controller 31 waits for the next zero-crossing event and switches relay 46 so that the hot lead 52 of power source 13 is disconnected from the load 17, and contacts 47 and 48 are connected. The controller then uses signals from the position sensors and optocouplers to check that relay 46 has switched, and implements a programmable time delay. When the next zero-crossing event occurs, the controller then switches relay 53 so that the neutral lead of power source 13 is disconnected from the load, and rather that the neutral lead of utility source 12 is connected through contacts 55 and 54 to the neutral lead 56 of the load 17.

The controller then checks the sensor signals to assure that relay 53 has switched, and institutes a programmable time-delay. After the next zero-crossing event it closes latching relay 39, which connects the hot lead 36 of utility power source 12 through connected contacts 41 and 42 to contacts 47 and 48 (already connected in the previous step) to complete the power circuit to the load 17. The controller 31 then checks the sensor signals to assure that relay 39 is properly switched, and the shift to the non-transfer state is complete. The operations depicted in FIGS. 6 and 7 are carried out automatically by the electronic controller, without manual intervention and faster than a human operator could perform these functions.

With regard to FIG. 2, a further embodiment of the invention provides another relay 71, comprised of a SPDT relay (which may be of either monostable or bistable type) that is actuated by the electronic controller 31, as are all the relays. Relay 71 does not play any role in the transition of voltage sources from the non-transfer state to the transfer state, as shown in FIGS. 3 and 4. Rather, relay 71 may be optionally connected to direct or interrupt power to a tertiary load terminal (independent from the load hot and load neutral). Relay 71 includes a switch pole 72 and a relay contact 73 that are connected together when relay 71 is actuated by the controller 31, and are connected to complete a circuit to an auxiliary dimming control circuit 74. It most commonly used to interrupt a low voltage dimming signal during a loss of normal/utility power (0-10V or DALI are the most popular in lighting industry). When the low voltage dimming signal is interrupted, dimming functionality of the load is disabled and the load illuminates at 100%. Alternatively, the auxiliary relay can selectively provide voltage to three terminal dimming ballasts as needed to ensure dimming functionality is disabled during loss of normal/utility power. Alternatively, the auxiliary relay can serve as a dry contact, indicating the state of the transfer switch 11.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be de fined by the claims appended hereto.

The invention claimed is:

1. An automatic transfer switch for transferring the electrical power supplied to a load between a primary power source and a secondary power source, including:
   a first relay comprising a SPST bistable relay having one contact connected to a hot lead of the primary power source, and a second contact;
   a second relay comprising a SPDT bistable relay having a switch pole connected to a hot lead of the load and first and second switch contacts, said first switch contact of said second relay being connected to said second contact of said first relay, said second switch contact of said second relay being connected to a hot lead of the secondary power source;
   a third relay comprising a SPDT bistable relay having a switch pole connected to a neutral lead of the load and first and second contacts, said first switch contact of said third relay being connected to a neutral lead of the primary power source, said second switch contact being connected to a neutral lead of said secondary power source;
   said relays being disposable in a non-transfer state in which said first relay is latched to connect said first and second contacts of said first relay to connect said primary power source hot lead to said first switch contact of said second relay, said second relay is disposed to connect said first switch contact of said second relay through said switch pole to said load, and said neutral lead of said primary power source is connected through the first switch contact of said third relay and said switch pole to said neutral lead of said load, whereby a power supply circuit is completed from the primary power source to the load;
   wherein said relays may be disposed in a transfer state in which said first relay is unlatched to disconnect said primary power source hot lead from said second relay, said second relay is disposed to connect said second switch contact of said second relay to said hot lead of the secondary power source to connect said hot lead of said secondary power source to the hot lead of the load, and said neutral lead of said secondary power source is connected through said second contact of said third relay and said switch pole to the neutral lead of the load, whereby a power supply circuit is completed from the secondary power source to the load;
   further including an electronic controller having internal programming instructions to operate said relays to switch between said transfer state and said non-transfer state;
   further including position sensors coupled to said relays for detecting the switch positions of said relays;
   further including voltage sensors connected to said primary and secondary power sources for monitoring the voltage and phase of said power sources;
   wherein said electronic controller includes programming steps to monitor the voltage of said primary power source on a continual basis, and when the voltage of said primary power source fails, the controller commands the transfer state through the steps:
   a) Wait for next zero crossing of primary power source voltage, then open said first relay;
   b) Check that said first relay is opened using position sensor signal;
   c) Initiate adjustable time delay;
   d) Wait for next zero crossing of primary power source voltage then switch said third relay to connect said neutral lead of said secondary power source to said load;
   e) Check that said third relay changed position using position sensor signal;
   f) initiate adjustable time delay;
   g) Wait for next zero crossing of secondary power source voltage, then switch second relay to connect said hot lead of said secondary power source to said hot lead of said load;
   h) Check second relay changed position using position sensor signals.

2. The automatic transfer switch of claim 1, further including a fourth relay operated by said electronic controller and connected to a switch/dimmer lead of lighting fixtures of said load and operated during said transfer state to bring said lighting fixtures to full brightness.

3. The automatic transfer switch of claim 1, wherein all connections to said third relay include neutral leads from said primary and secondary power sources and said load.

4. An automatic transfer switch for transferring the electrical power supplied to a load between a primary power source and a secondary power source, including:
   a first relay comprising a SPST bistable relay having one contact connected to hot lead of the primary power source, and a second contact;
   a second relay comprising a SPDT bistable relay having a switch pole connected to a hot lead of the load and first and second switch contacts, said first switch contact of said second relay being connected to said second contact of said first relay, said second switch contact of said second relay being connected to hot lead of the secondary power source;
   a third relay comprising a SPDT bistable relay having a switch pole connected to a neutral lead of the load and first and second contacts, said first switch contact of said third relay being connected to a neutral lead of the primary power source, said second switch contact being connected to a neutral lead of said secondary power source;
   said relays being disposable in a non-transfer state in which said first relay is latched to connect said first and second contacts of said first relay to connect said primary power source hot lead to said first switch contact of said second relay, said second relay is disposed to connect said first switch contact of said second relay through said switch pole to said load, and said neutral lead of said primary power source is connected through the first switch contact of said third relay and said switch pole to said neutral lead of said load, whereby a power supply circuit is completed from the primary power source to the load;
   wherein said relays may be disposed in a transfer state in which said first relay is unlatched to disconnect said primary power source hot lead from said second relay, said second relay is disposed to connect said second switch contact of said second relay to said hot lead of the secondary power source to connect said hot lead of said secondary power source to the hot lead of the load, and said neutral lead of said secondary power source is connected through said second contact of said third relay and said switch pole to the neutral lead of the load, whereby a power supply circuit is completed from the secondary power source to the load;

further including an electronic controller having internal programming instructions to operate said relays to switch between said transfer state and said non-transfer state;

further including position sensors coupled to said relays for detecting the switch positions of said relays;

further including voltage sensors connected to said primary and secondary power sources for monitoring the voltage and phase of said power sources: wherein said electronic controller includes programming steps to switch from the transfer state to the non-transfer state:
 a) Wait for next zero crossing of secondary power source voltage, then switch said second relay to disconnect said secondary power source hot lead from said hot lead of said load;

Check that said second relay is opened using position sensor signal;

c) Initiate adjustable time delay;
d) Wait for next zero crossing of primary power source voltage then switch said third relay to connect said neutral lead of said first power source to said load;
e) Check that said third relay changed position using position sensor signal;
f) Initiate adjustable time delay;
g) Wait for next zero crossing of primary power source voltage, then switch said first relay to connect said hot lead of said primary power source to said hot lead of said load;
h) Check second relay changed position using position sensor signals.

* * * * *